(12) United States Patent
Beyer et al.

(10) Patent No.: US 8,421,563 B2
(45) Date of Patent: Apr. 16, 2013

(54) ARRANGEMENT OF STRINGED SOLENOID DRIVES

(75) Inventors: Olaf Beyer, Dresden (DE); Claus Brust, Schrozberg (DE); Rainer Kunzler, Kunzelsau (DE); Simone Muller, Langenbrettach (DE); Ralf Scheibe, Kunzelsau (DE)

(73) Assignee: Buerkert Werke GmbH, Ingelfingen (DE)

( * ) Notice: Subject to any disclaimer, the term of this patent is extended or adjusted under 35 U.S.C. 154(b) by 174 days.

(21) Appl. No.: 12/680,628

(22) PCT Filed: Sep. 24, 2008

(86) PCT No.: PCT/EP2008/008078
§ 371 (c)(1),
(2), (4) Date: Jul. 9, 2010

(87) PCT Pub. No.: WO2009/046871
PCT Pub. Date: Apr. 16, 2009

(65) Prior Publication Data
US 2010/0289605 A1    Nov. 18, 2010

(30) Foreign Application Priority Data

Oct. 1, 2007  (DE) .................... 20 2007 013 709 U

(51) Int. Cl.
*H01F 7/00*  (2006.01)
(52) U.S. Cl.
USPC ................... 335/229; 335/220; 251/129.15

(58) Field of Classification Search .......... 335/220–229; 251/129.01–129.22
See application file for complete search history.

(56) References Cited

U.S. PATENT DOCUMENTS

| 2,897,415 | A | * | 7/1959 | Stockl ........................... 335/230 |
| 4,321,570 | A | * | 3/1982 | Tsunefuji ...................... 335/229 |
| 4,543,991 | A |   | 10/1985 | Fuchs |
| 2002/0175580 | A1 |   | 11/2002 | Ogino |
| 2008/0035093 | A1 | * | 2/2008 | Sedda et al. ............... 123/188.4 |
| 2009/0314975 | A1 |   | 12/2009 | Scheibe |

FOREIGN PATENT DOCUMENTS

| DE | 32 08 348 A1 | 12/1982 |
| DE | 32 30 162 A1 | 2/1984 |
| DE | 197 35 560 A1 | 2/1999 |
| DE | 20 2006 006 825 U1 | 10/2007 |
| EP | 0 225 388 A1 | 6/1987 |
| GB | 2 098 805 A | 11/1982 |

* cited by examiner

*Primary Examiner* — Bernard Rojas
(74) *Attorney, Agent, or Firm* — Tarolli, Sundheim, Covell & Tummino LLP

(57) ABSTRACT

The invention relates to an arrangement of stringed solenoid drives (1, 2, 3), particularly for solenoid valves, wherein each solenoid drive comprises a magnetic circuit with a yoke (4), moveable armature (5), and an excitation coil (6) arranged on the yoke. The magnetic circuits of neighboring solenoid drives have pre-magnetization with the same polarity and at least approximately the same strength. Due to the pre-magnetization, the magnetic potential difference between neighboring magnetic circuits is reduced. The pre-magnetization is thus carried out with the same polarity as the excitation by current flow in the excitation coil.

18 Claims, 6 Drawing Sheets

PRIOR ART

ARRANGEMENT OF STRINGED SOLENOID DRIVES

FIELD OF THE INVENTION

The invention relates to an in-line array of closely spaced solenoid drives in which each solenoid drive includes a magnetic circuit with a yoke, a movable armature, and an excitation winding disposed on the yoke.

BACKGROUND OF THE INVENTION

There are various application fields for systems in which quite a number of magnetic circuits are placed in a relationship of mutual influence, without any magnetizable parts being in direct contact. This is the case, e.g., when a number of solenoid valves are disposed closely spaced in an in-line array.

The smaller the solenoid valves in terms of their outer dimensions and the closer they are to be arranged next to each other for reasons of space, the greater the extent of undesirable mutual influence of the magnetic circuits on each other. This is accompanied by losses of energy. Magnetic flux does not stay within an apparatus, but flows off, ineffective in terms of power for this apparatus, via neighboring, magnetically conductive metal parts or is redirected to neighboring magnetic circuits. In the most unfavorable case, it may happen that a valve is unintentionally also switched when its neighboring valve switches.

Solenoid valves that are arranged side by side therefore require a higher voltage for switching or are no longer responsive at all.

SUMMARY OF THE INVENTION

The arrangement according to the invention serves to reduce the leakage flux to neighboring magnetic circuits and allows a reliable switching of solenoid valves disposed in an in-line array, with a minimum amount of energy applied.

Specifically, the invention provides an in-line array of closely spaced solenoid drives in which each solenoid drive includes a magnetic circuit with a yoke, a movable armature, and an excitation winding disposed on the yoke. The magnetic circuits of adjacent solenoid drives have a pre-magnetization of same magnetic polarity and of at least approximately same strength as a magnetization caused by current flow in the excitation winding of each solenoid drive. The pre-magnetization causes the magnetic potential difference between neighboring magnetic circuits to be reduced. The pre-magnetization is thus effected with the same polarity as the excitation by current flow in the excitation winding.

The pre-magnetization may be effected by means of permanent magnets or else by applying a bias current in the amount of a fraction of the normal exciting current to the excitation windings.

Alternatively, the pre-magnetization is produced by an external magnetic field which is the same for all neighboring magnetic circuits.

BRIEF DESCRIPTION OF THE DRAWINGS

The invention will now be described in greater detail with reference to the accompanying drawings, in which.

DESCRIPTION OF PREFERRED EMBODIMENTS

Figure 1:
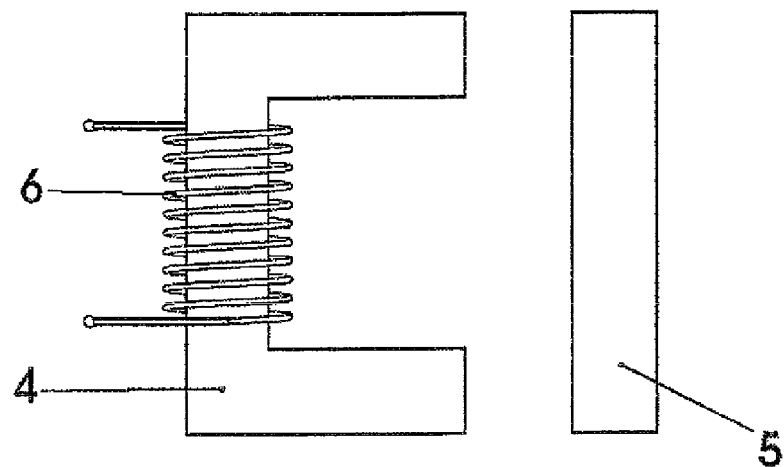
FIG. 1 shows a magnetic circuit of the type usually employed in solenoid valves.

A conventional magnetic circuit as shown in FIG. 1 is comprised of a U-shaped yoke 4, a winding 6 and an armature 5.

Figure 2:
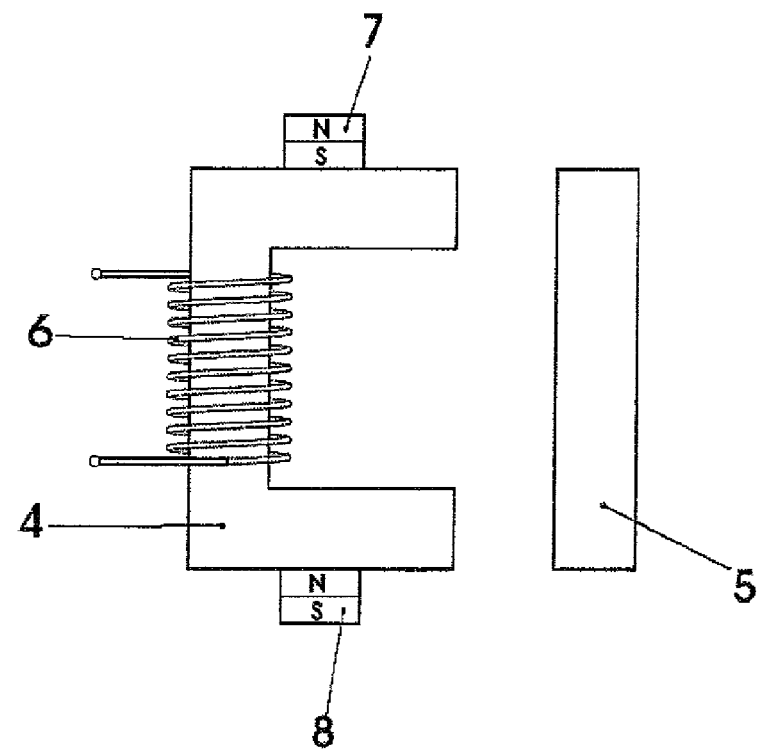
FIG. 2 shows a first arrangement, according to the invention, of permanent magnets on a magnetic circuit.

The magnetic circuit in FIG. 2 is likewise comprised of a yoke 4, a winding 6 and an armature 5. In addition, at least two permanent magnets 7 and 8 are arranged on the limbs of the yoke 4, the polarization of these permanent magnets being opposite to each other on their faces contacting the limbs. Accordingly, the permanent magnet 7 contacts one yoke limb by its south pole face and the permanent magnet 8 contacts the other limb by its north pole face.

The permanent magnets 7 and 8 may either be seated both on the outer sides of the yoke limbs or both on the inner sides.

To reinforce the effect, a plurality of magnets each with the same polarization direction may be stacked on each limb.

Rather than carrying out the above described pre-magnetization of the magnetic circuits disposed in an in-line array by means of permanent magnets, an bias current feed may also be made use of.

Figure 3:
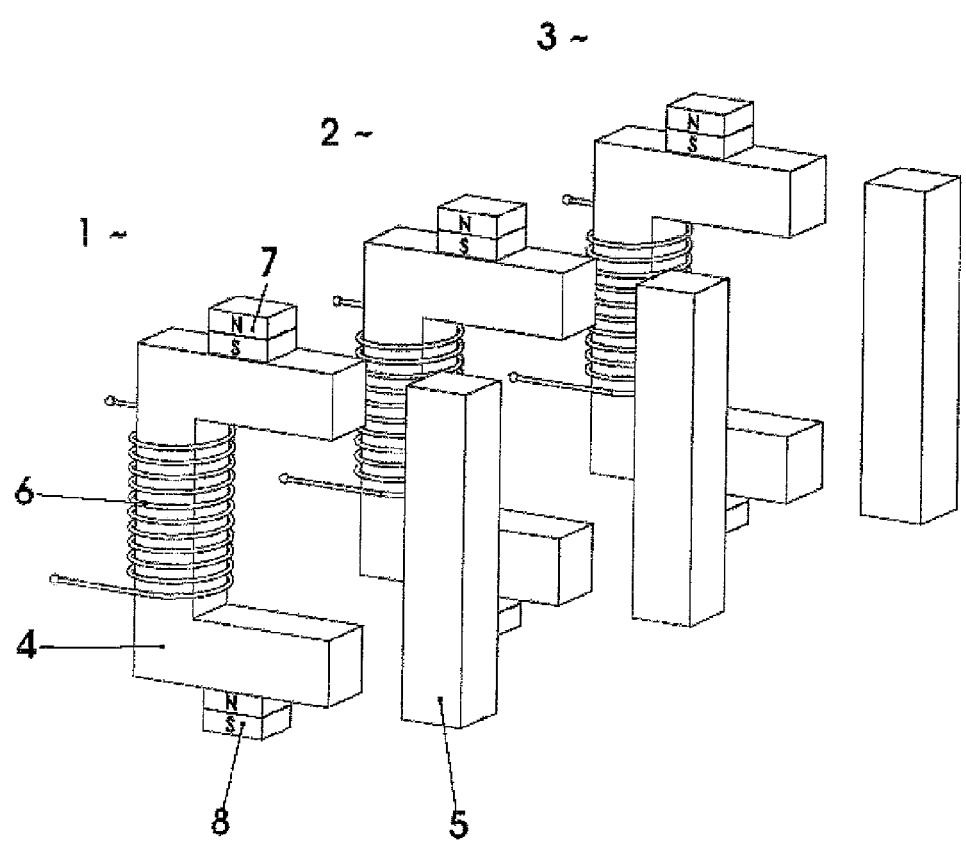
FIG. 3 shows a plurality of (for example three) identical, closely adjacent magnetic circuits.

FIG. 3 illustrates a plurality of (for example three) identical magnetic circuits arranged side by side in a closely adjacent relationship. In the practical application, the distances between the individual magnetic circuits 1, 2 and 3 are minimal, i.e. smaller than shown in FIG. 3. The magnetic circuits are more particularly part of miniaturized solenoid valves.

When the winding 6 in the magnetic circuit 2 is energized while the windings 6 of the two magnetic circuits 1 and 3 remain without a current, the yoke 4 of the magnetic circuit 2 made of a magnetic material is magnetized and will attract the armature 5 of the magnetic circuit 2, likewise made of a magnetic material.

The yokes 4 in the neighboring magnetic circuits 1 and 3 are pre-magnetized by the permanent magnets 7 and 8.

As a result, the difference of potential between the yoke 4 and the armature 5 within the magnetic circuit 2 is greater than the difference of potential between the yoke 4 of the magnetic circuit 2 and the yokes 4 of the neighboring magnetic circuits 1 and/or 3.

Consequently, only the magnetic circuit 2 will switch and the two neighboring magnetic circuits 1 and 3 will not.

Ideally, any leakage flux from the magnetic circuit 2 to the magnetic circuits 1 or 3 will not occur or is at least greatly reduced.

Figure 4:
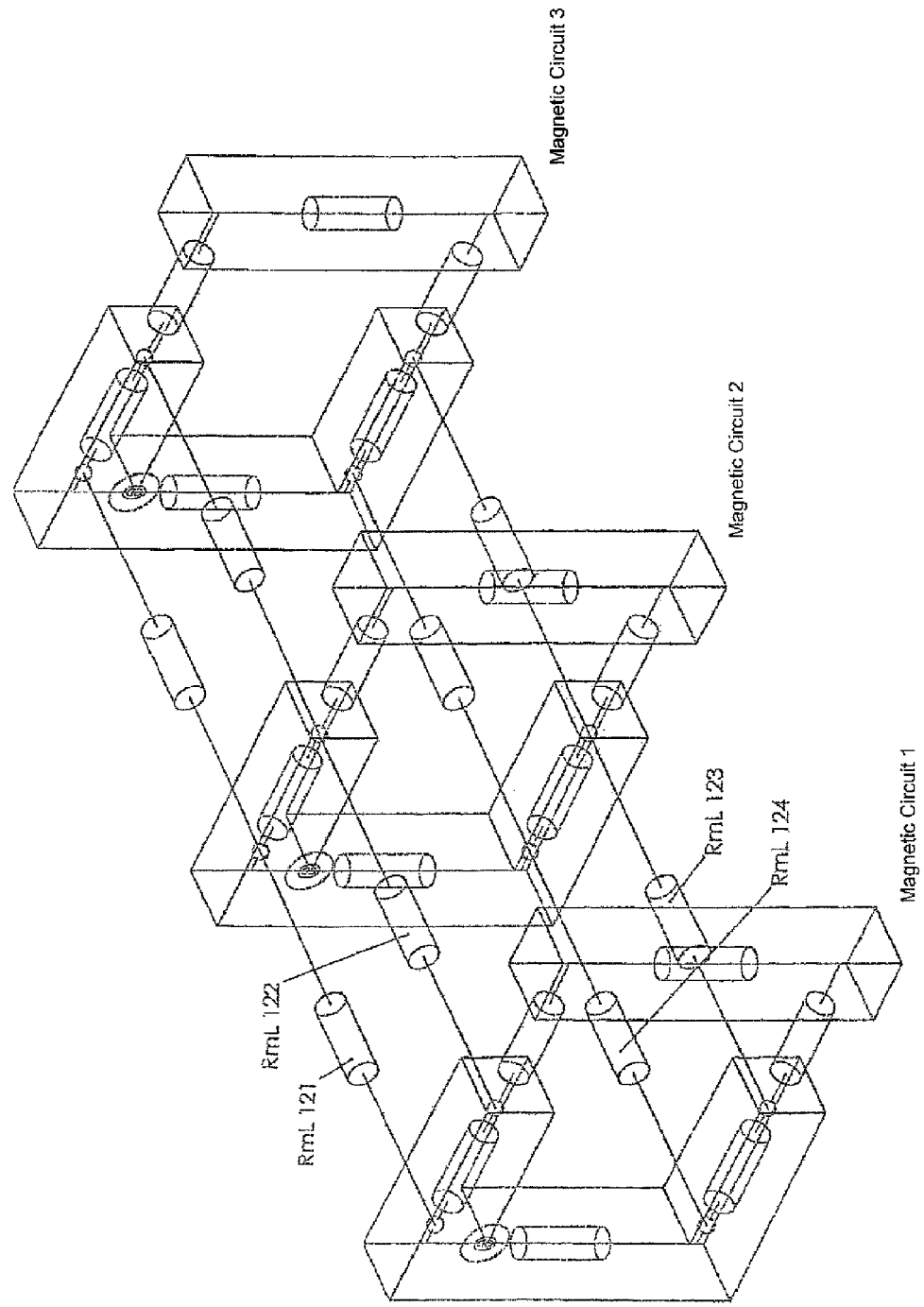
FIG. 4 schematically shows the magnetic resistances on the closely adjacent magnetic circuits of FIG. 3.

FIG. 4 schematically illustrates the effective magnetic resistances at and between the magnetic circuits. Of interest here are the air gap resistances between neighboring magnetic circuits. For the magnetic circuits 1 and 2, the air gap resistances between opposite yoke limbs are denoted by RmL121, RmL122 and RmL123, RmL124. While the magnetic air gap resistances are proportional to the distance, they are also inversely proportional to the surface area of the opposite surfaces. Since the distances are small and the surfaces are relatively large, the magnetic air gap resistance is correspondingly small.

While an equipolar pre-magnetization using permanent magnets generates a small closing force, this closing force (with the permanent magnets being appropriately designed) is not sufficient for the armature to be attracted.

Now, the advantage of the equipolar pre-magnetization using permanent magnets resides in that during the switching of neighboring devices, practically no more leakage flux develops between the devices. The reason for this is that opposite pole faces are always of the same name (irrespective of whether or not the devices are energized!), between which no magnetic flux arises.

Figure 5A:
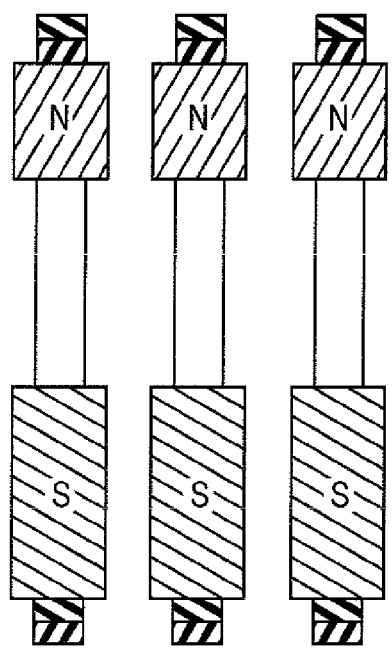
FIG. 5a shows a schematic representation of magnetic circuits closely disposed in an in-line array, with pre-magnetization, but without current flow.

FIG. 5a schematically shows three magnetic circuits closely disposed in an in-line array, with a pre-magnetization having the same direction and strength, but without current flow. The direction of the hatching indicates the polarity and the density of the hatching indicates the strength of the magnetic flux. The pre-magnetization causes a small magnetic flux to develop in the ferromagnetic circuits, which, however, is too weak to cause the armatures of the magnetic circuits to be attracted.

Figure 5B:
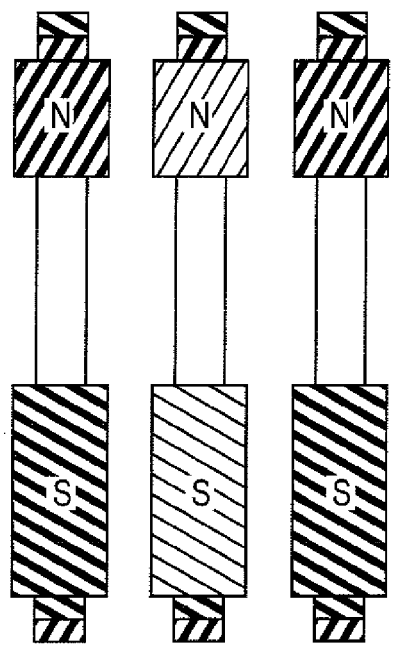
FIG. 5b shows a schematic representation of the same magnetic circuits with pre-magnetization and current flow in the outer magnetic circuits.

In FIG. 5b it is assumed that the two outer magnetic circuits are energized while the one in the middle is not. In the outer magnetic circuits a strong magnetic flux develops which causes the armatures to be attracted. In the middle magnetic circuit no or only a very small leakage flux develops since owing to the pre-magnetization, the poles opposing each other are still of the same name, though of different strengths. Practically no flux line transition takes place between the north and south poles.

Figure 5C:
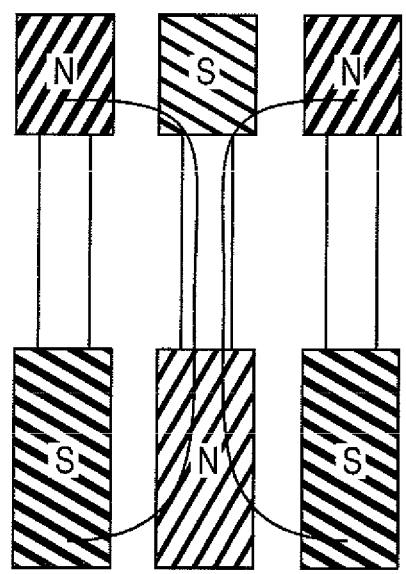
FIG. 5c shows a schematic representation of the same magnetic circuits without pre-magnetization, but with current flow in the outer magnetic circuits.

In FIG. 5c, again the two outer magnetic circuits are energized, but there is no pre-magnetization. In the outer magnetic circuits a strong magnetic flux is produced, which causes the armature to be attracted. However, because of the small distance between the pole faces of the magnetic circuits, flux lines also close over the middle magnetic circuit and leakage flux develops. A magnetic polarization is produced at the middle magnetic circuit which is opposite to that of the outer magnetic circuits but which, in the most unfavorable case, may be sufficient to cause the armature of the middle device to be attracted although the middle magnetic circuit is not energized.

Under these circumstances, the pre-magnetization, proposed according to the invention, of all of the magnetic circuits disposed in an in-line array turns out to be very effective for reducing the magnetic leakage fields by reducing the magnetic potential differences between neighboring magnetic circuits.

Figure 6:
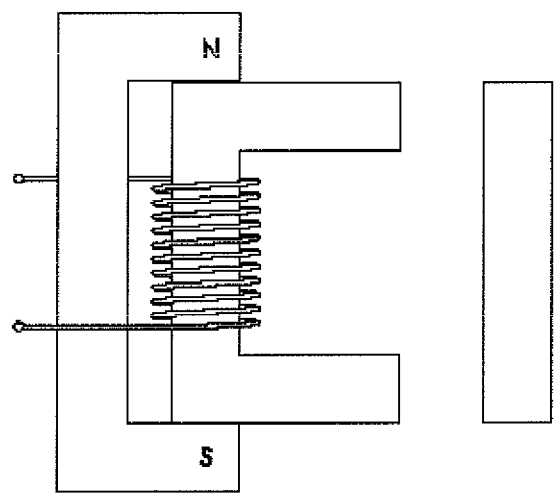
FIG. 6 shows an arrangement, according to the invention, of a permanent magnet on a U-shaped yoke.

In a further embodiment shown in FIG. 6, a U-shaped or C-shaped permanent magnet is engaged about the U-shaped yoke.

Figure 7:
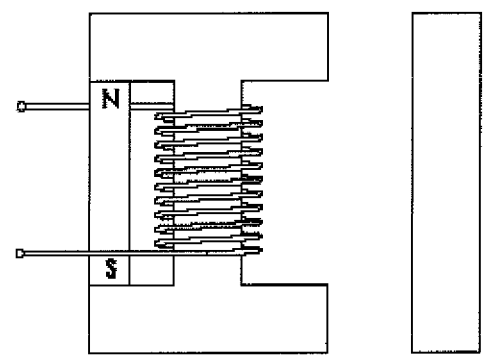
FIG. 7 shows an arrangement, according to the invention, of a bar magnet on a double-T-shaped yoke.

In the embodiment shown in FIG. 7, the yoke is double-T-shaped. A bar-shaped or rod-shaped permanent magnet is inserted between the legs of the double-T-shaped yoke.

Although the invention has been described hereinabove with reference to a specific embodiment, it is not limited to this embodiment and no doubt further alternatives will occur to the skilled person that lie within the scope of the invention as claimed.

The invention claimed is:

1. An in-line array of closely spaced independent solenoid drives of solenoid valves in which each solenoid drive includes a magnetic circuit with a yoke, a single, associated movable armature, and an excitation winding disposed on the yoke, wherein magnetic circuits of adjacent solenoid drives have a pre-magnetization of same magnetic polarity and of at least approximately same strength as a magnetization caused by current flow in the excitation winding of each solenoid drive in order to avoid or at least reduce leakage fluxes between adjacent magnetic circuits.

2. The in-line array according to claim 1, wherein said pre-magnetization is generated by permanent magnets.

3. The in-line array according to claim 2, wherein the yokes of the magnetic circuits are U-shaped with two parallel spaced limbs and permanent magnets are arranged on both limbs of the yokes.

4. The in-line array according to claim 2, wherein the permanent magnets are U-shaped with two parallel spaced limbs engaged on the yokes of the magnetic circuits.

5. The in-line array according to claim 2, wherein the yokes of the magnetic circuits are double-T-shaped with two parallel spaced legs and rod shaped permanent magnets are inserted between the legs.

6. The in-line array according to claim 2, wherein the permanent magnets are arranged on opposite sides of two yoke limbs.

7. The in-line array according to claim 1, wherein the pre-magnetization is generated by a bias current flow through the excitation winding in an amount of a fraction of a regular exciting current.

8. The in-line array according to claim 1, wherein the pre-magnetization is generated by an external magnetic field to which said magnetic circuits are exposed.

9. The in-line array according to claim 1, wherein all armatures are arranged vis-à-vis their associated yokes.

10. An array of a plurality of solenoid valves disposed closely spaced in an in-line array, each solenoid valve having its own solenoid drive, each solenoid drive including a magnetic circuit with a yoke, a movable armature, and an excitation winding disposed on the yoke, wherein magnetic circuits of adjacent solenoid drives have a pre-magnetization of same magnetic polarity and of at least approximately same strength as a magnetization caused by current flow in the excitation winding of each solenoid drive in order to avoid or at least reduce leakage fluxes between adjacent magnetic circuits, wherein each valve is switched independently from its at least one neighboring valve.

11. The in-line array according to claim 10, wherein said pre-magnetization is generated by permanent magnets.

12. The in-line array according to claim 11, wherein the yokes of the magnetic circuits are U-shaped with two parallel spaced limbs and permanent magnets are arranged on both limbs of the yokes.

13. The in-line array according to claim 11, wherein the permanent magnets are U-shaped with two parallel spaced limbs engaged on the yokes of the magnetic circuits.

14. The in-line array according to claim 11, wherein the yokes of the magnetic circuits are double-T-shaped with two parallel spaced legs and rod shaped permanent magnets are inserted between the legs.

15. The in-line array according to claim 10, wherein the pre-magnetization is generated by a bias current flow through the excitation winding in an amount of a fraction of a regular exciting current.

16. The in-line array according to claim 10, wherein the pre-magnetization is generated by an external magnetic field to which said magnetic circuits are exposed.

17. The in-line array according to claim 10, wherein all armatures are arranged vis-à-vis their associated yokes.

18. The in-line array according to claim 11, wherein the permanent magnets are arranged on opposite sides of two yoke limbs.

\* \* \* \* \*